(12) United States Patent
Veneziano et al.

(10) Patent No.: US 7,097,006 B2
(45) Date of Patent: Aug. 29, 2006

(54) DISC BRAKE BRAKING BAND AND DISC FOR A DISC BRAKE

(75) Inventors: Aristide Veneziano, Lallio (IT); Alberto Previtali, Palazzago (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 10/312,463

(22) PCT Filed: Aug. 30, 2002

(86) PCT No.: PCT/IT02/00559

§ 371 (c)(1),
(2), (4) Date: Dec. 24, 2002

(87) PCT Pub. No.: WO2004/020862

PCT Pub. Date: Mar. 11, 2004

(65) Prior Publication Data

US 2004/0040802 A1   Mar. 4, 2004

(51) Int. Cl.
*F16D 65/12* (2006.01)

(52) U.S. Cl. ............................................. 188/218 XL

(58) Field of Classification Search ......... 188/218 XL, 188/264 AA, 18, 264 A; D12/180; 192/107 R
See application file for complete search history.

(56) References Cited

U.S. PATENT DOCUMENTS

| | | |
|---|---|---|
| 2,144,223 A | 1/1939 | Klocke |
| 2,728,421 A | 12/1955 | Butler |
| 2,835,355 A | 5/1958 | Armstrong |
| 3,425,524 A | 2/1969 | Dewar |
| 3,623,577 A | 11/1971 | Scharlack |
| 3,809,192 A | 5/1974 | Stehle |
| 3,972,400 A | 8/1976 | Howells |
| 4,286,694 A | 9/1981 | Wiseman, Jr. et al. |
| 4,379,501 A | 4/1983 | Hagiwara et al. |
| 4,396,100 A | 8/1983 | Eltze |
| 4,726,455 A | 2/1988 | East |
| 4,995,500 A | 2/1991 | Payvar |
| 5,101,953 A | 4/1992 | Payvar |
| 5,176,236 A | 1/1993 | Ghidorzi et al. |

(Continued)

FOREIGN PATENT DOCUMENTS

DE         2507264         9/1976

(Continued)

OTHER PUBLICATIONS

Kopin ur biltemakatalogen 1999/2000.

(Continued)

*Primary Examiner*—James McClellan
*Assistant Examiner*—Bradley King
(74) *Attorney, Agent, or Firm*—Kenyon & Kenyon LLP (57) ABSTRACT

A braking band for a disc-brake disc includes opposed annular braking surfaces which extend from an inner edge facing towards the axis of rotation to an outer edge facing towards the outside of the disc. The braking band has a uniform distribution of grooves having a pattern or module that is repeated circumferentially in a manner such that the distribution is circumferentially uniform. According to an example embodiment, each of the grooves is closed and extends along a predominant line of extent defining an axis. The module extends from an inner radius to an outer radius which define an annular portion. The module further includes a first groove extending from the inner radius to the outer radius, a second groove, and a third groove that are shorter than the first groove. The axes of the second groove and of the third groove have an opposite inclination to the axis of the first groove.

23 Claims, 9 Drawing Sheets

U.S. PATENT DOCUMENTS

| | | | |
|---|---|---|---|
| 5,358,086 A | 10/1994 | Muller et al. | |
| 5,474,161 A | 12/1995 | Eaton, III et al. | |
| 5,480,007 A | 1/1996 | Hartford | |
| D381,609 S * | 7/1997 | Ohata et al. | D12/180 |
| 5,662,192 A | 9/1997 | Kingston et al. | |
| 5,671,835 A | 9/1997 | Tanaka et al. | |
| 5,682,971 A | 11/1997 | Takakura et al. | |
| 5,735,366 A | 4/1998 | Suga et al. | |
| 5,765,667 A | 6/1998 | Ross et al. | |
| 5,819,888 A | 10/1998 | Tamura et al. | |
| 6,186,293 B1 * | 2/2001 | Beer et al. | 188/218 XL |
| 6,279,698 B1 * | 8/2001 | Oberti | 188/218 XL |
| 6,446,770 B1 | 9/2002 | Qian et al. | |
| 2001/0040077 A1 | 11/2001 | Qian et al. | |

FOREIGN PATENT DOCUMENTS

| | | | |
|---|---|---|---|
| DE | 2620261 | | 11/1977 |
| DE | 40 02 695 | * | 8/1991 |
| DE | 198 24 465 | | 12/1999 |
| EP | 0 287 017 | | 10/1988 |
| FR | 2561732 | | 9/1985 |
| GB | 2 268 552 | | 1/1994 |
| JP | 62-209234 | | 9/1987 |
| JP | 10026159 | | 1/1988 |
| JP | 63259227 | | 10/1988 |
| JP | 2017235 | | 1/1990 |
| JP | 55054733 | | 3/1993 |
| JP | 08145091 | | 6/1996 |
| SU | 1484995 | | 6/1989 |
| WO | WO 97/43559 | | 11/1997 |
| WO | 0 902 209 | * | 3/1999 |
| WO | WO 02/06694 | | 1/2002 |

OTHER PUBLICATIONS

OMP Racing Catalogue.

Doug Gore, *Brake Pad Science*, Stock Car Racing, Feb. 1997, pp. 66-83.

Wilwood Engineering, Inc., Brochure, 1993, pp. 16, 29.

Wilwood Engineering, Inc., Brake Rotor Design Drawing.

* cited by examiner

DISC BRAKE BRAKING BAND AND DISC FOR A DISC BRAKE

FIELD OF THE INVENTION

The present invention relates to braking apparatus for an automobile, and more particularly relates to a braking band provided with at least one grooved braking surface.

BACKGROUND INFORMATION

Conventional grooved rotors for discs and clutches are known in the art. Conventional grooved bands have a distribution of grooves that are generally not optimal for achieving an optimal mean coefficient of friction or for balancing the stresses on the pads and thus eliminating the vibrations induced in the disc and in the pad by their interaction during the braking operation.

In such conventional braking bands, the expression "principal direction of rotation of the disc" defines the direction of rotation corresponding to forward movement of the vehicle. An axis lying in a plane perpendicular to the axis of rotation of the braking band and intersecting the axis of rotation is referred to as a "radial direction". An axis tangential to a circle lying in a plane perpendicular to the axis of rotation of the braking band and having a point on the axis of rotation at its centre is referred to as a "tangential direction". The circle defines a circumferential direction of the disc.

DETAILED DESCRIPTION OF THE INVENTION

With reference to the drawings, a braking band of a disc-brake disc is indicated 14. The disc is particularly suitable for applications on high-performance vehicles such as, for example, racing cars.

An axis of rotation of the disc which, according to an example embodiment, constitutes an axis of symmetry of the disc, is indicated A—A.

In the drawings, the principal direction of rotation of the disc, that is, the direction of rotation corresponding to forward travel of the vehicle, is indicted R. An axis lying in a plane perpendicular to the axis of rotation A—A and intersecting the axis of rotation is indicated by a radial direction r. With reference to the radial direction, an inner portion is a portion in the vicinity of the axis of rotation A—A, and an outer portion is a portion remote from the axis of rotation A—A and in the vicinity of the outer portion of the disc.

An axis tangential to a circle lying in a plane perpendicular to the axis of rotation A—A and having a point on the axis of rotation as its centre is indicated as a tangential direction t. The circle defines a circumferential direction c of the disc.

The disc includes a support bell, not shown, for connecting the disc to a vehicle hub, for example, by means of through-holes provided in a portion thereof. The braking band 14 is suitable for being supported by the bell.

According to an example embodiment, the braking band and the bell are formed in two separate pieces which can be connected to one another, for example, by the formation of a tangential restraint, an axial restraint and/or, in some cases, a radial restraint.

Two opposed braking surfaces, which define the braking band 14 laterally, are indicated 16 and 18. An annular surface of the braking band coaxial with the axis of rotation A—A and extending radially with a width H corresponding to the distance between an inner edge 20 and an outer edge 22 of the braking band 14 is referred to as the braking surface. The inner edge faces the axis of rotation A—A and the outer edge faces the outside of the disc. The two braking surfaces are defined as opposed since they are disposed on opposite sides of a central plane of the braking band perpendicular to the axis of rotation A—A.

According to an example embodiment, the braking band 14 is of the ventilated type, that is, it comprises two plates 24 and 26 arranged facing one another so as to form an air-outlet space 28. When the disc 14 is mounted on a vehicle, an outer plate, that is, a plate which faces outwardly relative to the vehicle, is indicated 24 and an inner plate, that is, a plate which faces inwardly relative to the vehicle, is indicated 26. Each plate 24 or 26 defines a corresponding braking surface 16 or 18.

According to a particular example embodiment, the two plates are connected to one another by means of connecting elements which extend from one plate to the other, predominantly within the space 28. The connecting elements may include fins 30 shaped so as to define ventilation ducts 32. A fin 30 comprises a wall having a predominant line of extent 34, that is, a wall the length of which, considered along the predominant line of extent 34, is significantly greater than its thickness, taken in a direction transverse the predominant line of extent 34. The predominant line of extent 34 of a fin 30 is defined substantially by the centreline of the fin, relative to its thickness.

Each fin 30 and each predominant line of extent 34 define an axis 34a of the fin. This axis may be defined as the straight line along which the fin substantially extends. For straight fins, the predominant line of extent coincides substantially with the axis. For arcuate fins, the axis may, for example, be defined by the line which passes through the two ends of the fin.

According to an example embodiment, a fin 30 may include a continuous wall along the respective line of extent 34. According to a further example embodiment, a fin 30 comprises a discontinuous wall along the respective predominant line of extent 34, that is, it includes at least two portions which are interrupted relative to one another along the predominant line of extent 34. According to a further example embodiment, a braking band 14 has fins of both of the above-mentioned types, and may be arranged so that each type alternates with one another.

Figure 1:
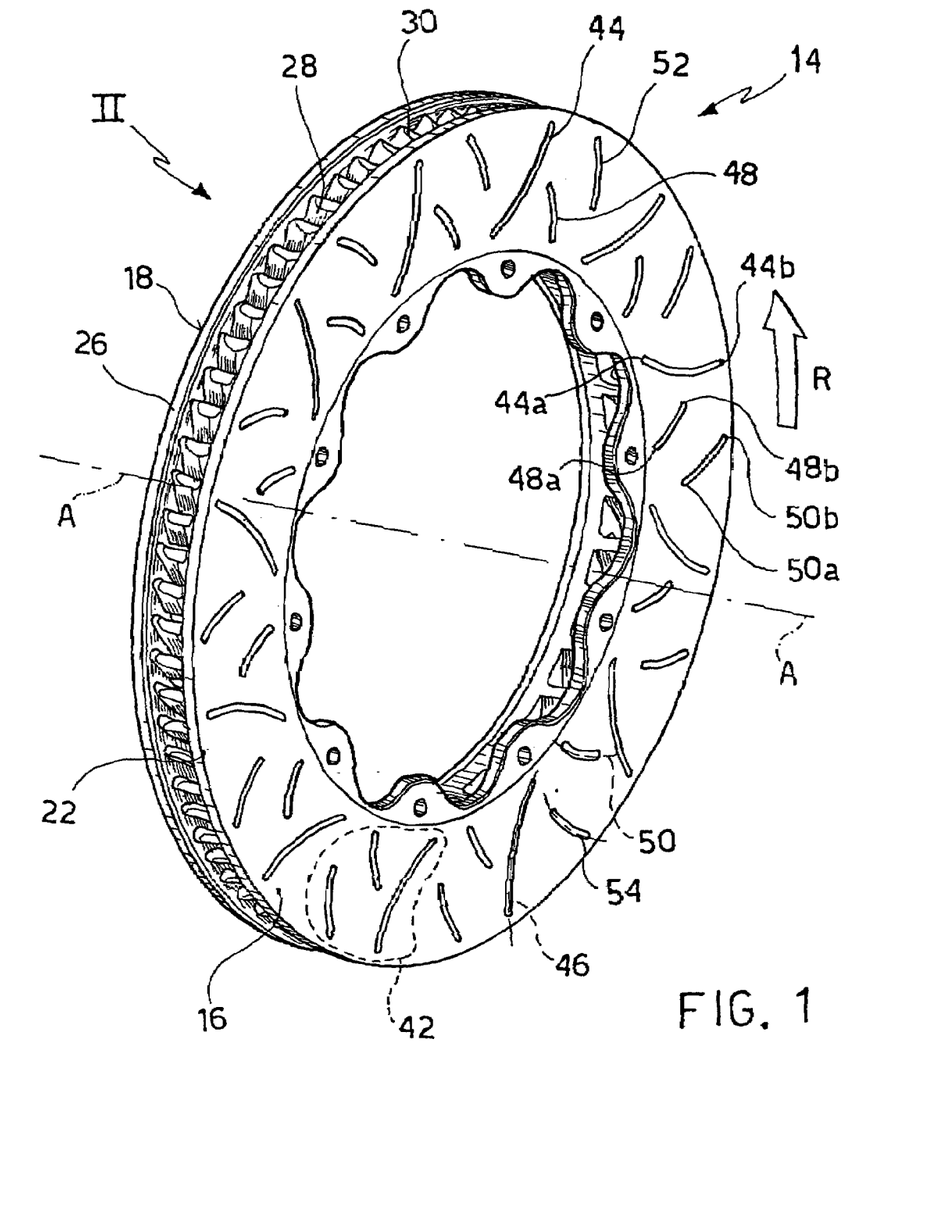
FIG. 1 is a perspective view of a braking band according to an example embodiment of the present invention.
Figure 2:
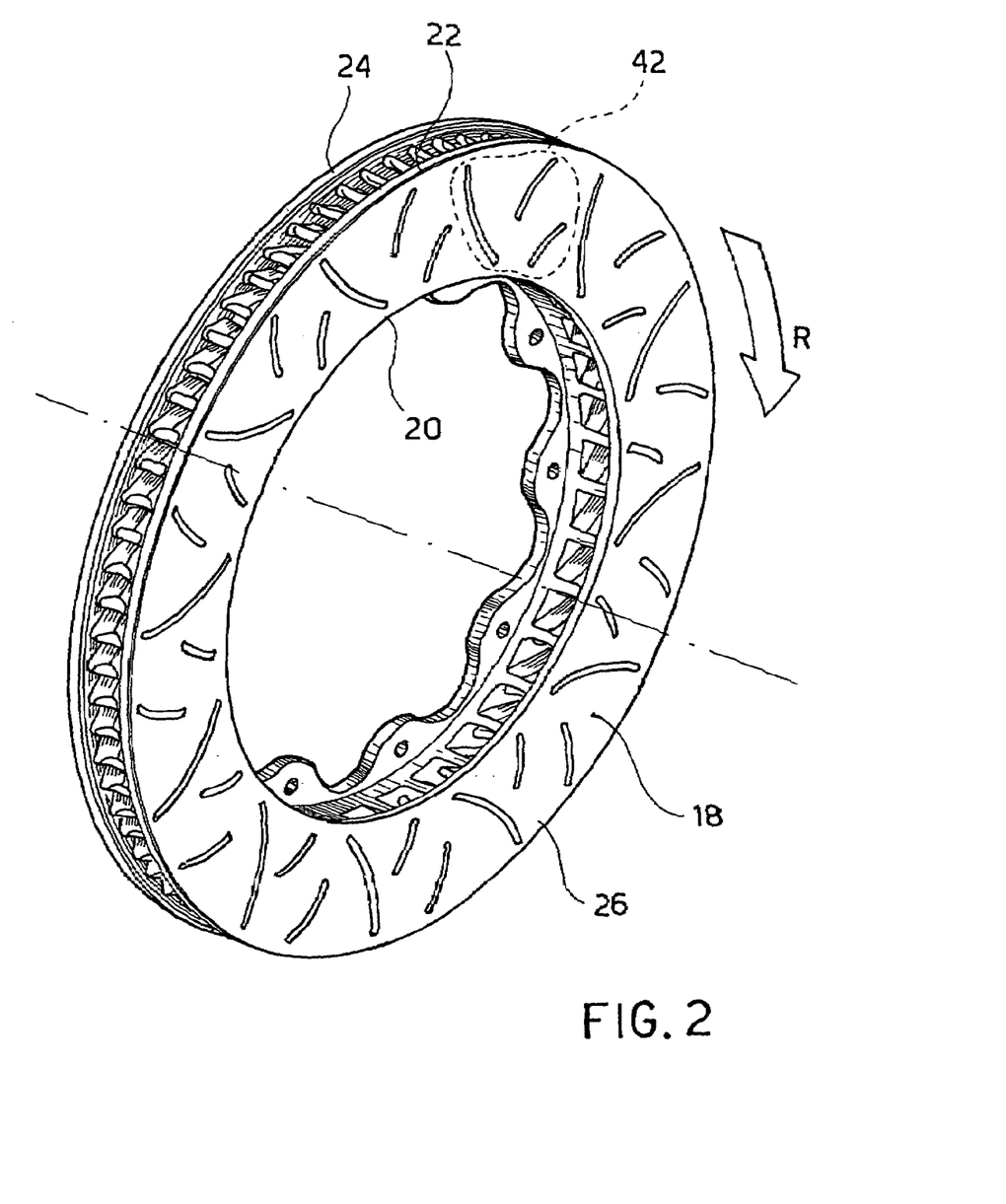
FIG. 2 is a perspective view of the braking band of FIG. 1, taken along the arrow II of FIG. 1.
Figures 3, 4:
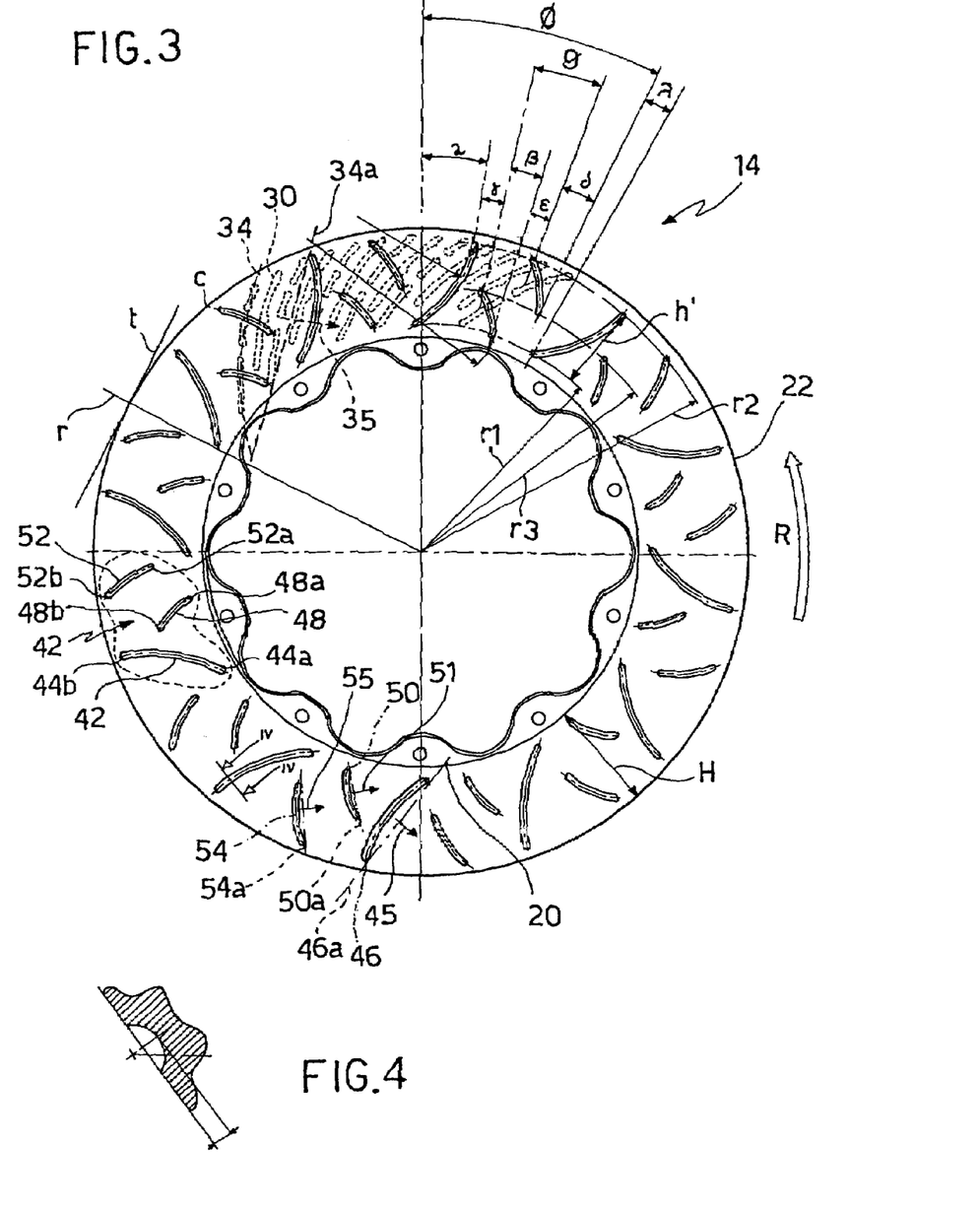
FIG. 3 is a plan view of the braking band of FIG. 1.
FIG. 4 is a partial view of a detail of the braking band of FIG. 3, taken along the line IV—IV.

The axis 34a of each fin 30 may be inclined to a radial direction r and, in particular, may be inclined in the opposite direction to the principal direction of rotation R of the disc. In FIG. 3, the direction of rotation R is anticlockwise and the axis of each fin is inclined to a radial direction r of the disc in a clockwise direction.

According to a possible embodiment, the fins 30 and their respective predominant lines of extent 34, both when the fin is continuous and when it is interrupted, are arcuate and have concave portions facing in the opposite direction to the direction of rotation. Taking as a reference a radius or vector 35 perpendicular to the predominant line of extent 34 or to the axis 34a of the fin and directed towards the centre of curvature of the arcuate line defining the axis, this vector 35 is directed in the opposite direction to the principal direction of rotation R.

According to an example possible embodiment in which the fins 30 are arcuate, the fins may be inclined to radial directions r in a manner such that the vector 35 defined above is directed substantially towards the inside of the disc, relative to a circle of the braking band 14 extending through a central point of the fin.

According to a further example embodiment, the predominant line of extent 34 of a fin may be a portion of a circle having its centre disposed towards the inside of the braking band relative to a circle extending through a central point of the fin. In this case, the vector 35 corresponds to the radius of the circle, with a direction towards the centre of the circle.

Figure 5A:
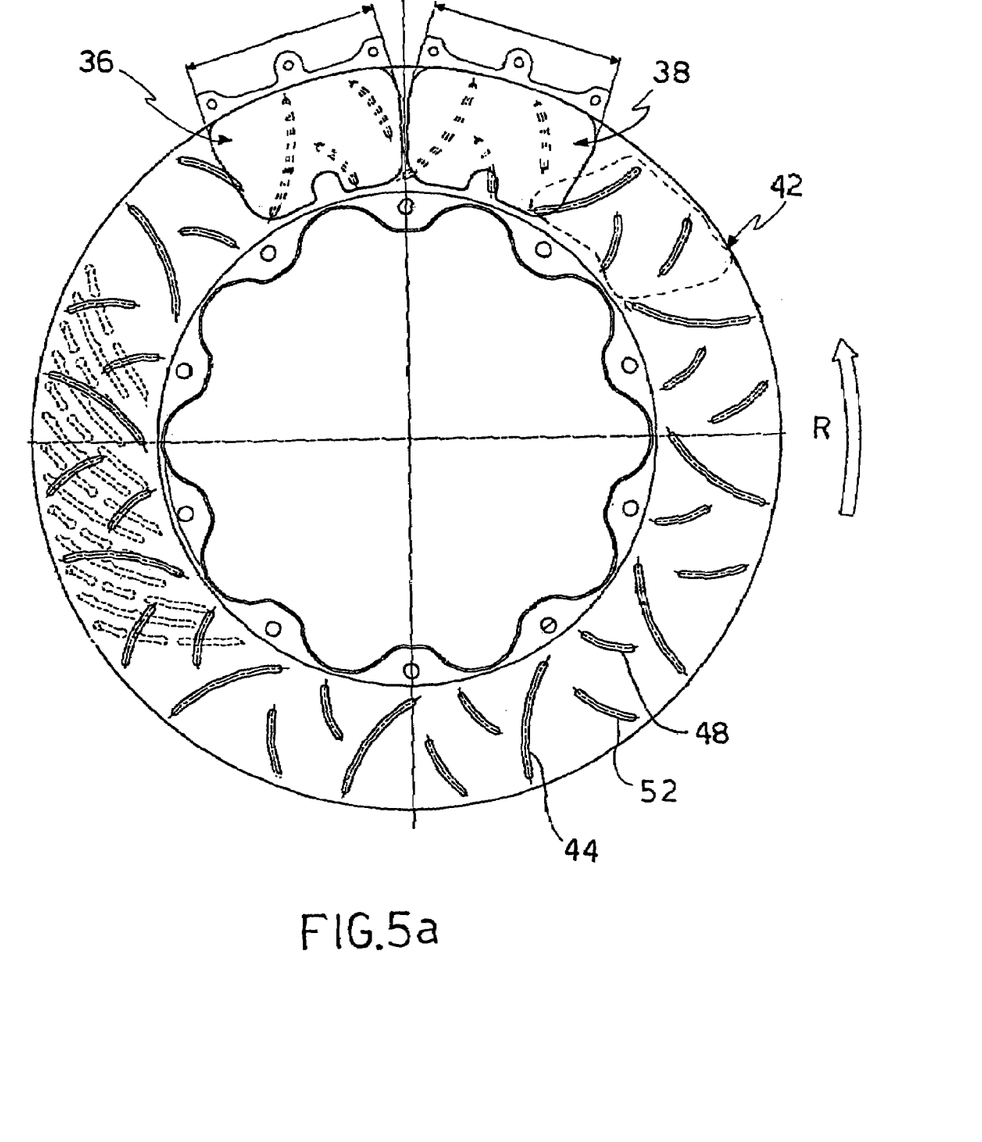
FIG. 5a is a plan view of the braking band of FIG. 1 with pads of a particular construction.
Figure 5B:
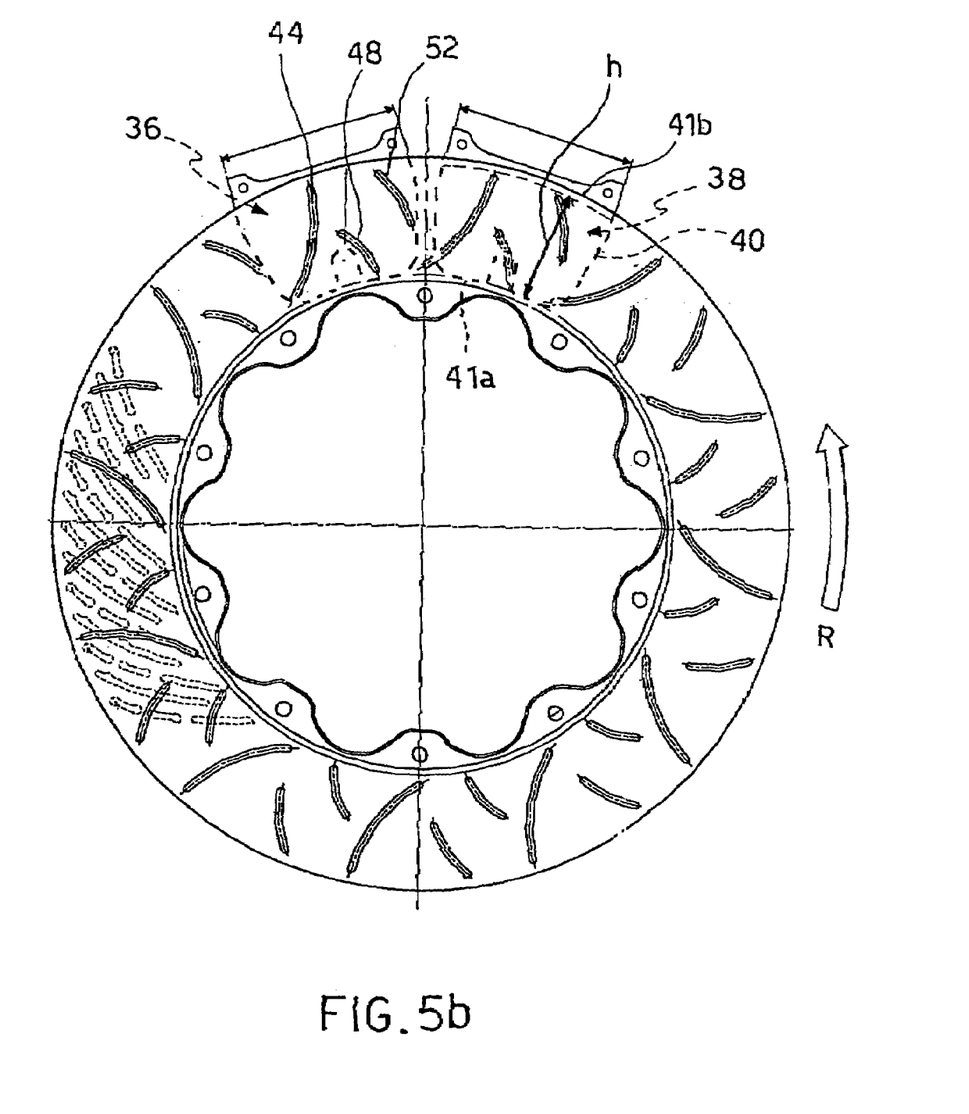
FIG. 5b is a plan view of the braking band of FIG. 1, with pads of an alternative construction.

The braking surfaces 16, 18 are suitable for cooperating with suitable pads of a brake caliper, not shown, arranged astride the disc. FIG. 5a shows pads 36 and 38 acting on the same braking surface. In FIG. 5b, which shows an alternative example embodiment, the pads are shown in broken outline. According to a possible embodiment, each pad 36, 38 includes a portion of friction material supported by a plate.

When a braking force is exerted, the pads are pressed against the braking band, coming into contact with the corresponding braking surface. A portion of the braking surface corresponding to the area which comes into contact with the friction material of the pad when the braking force is exerted is defined as the contact area 40. During the rotation of the disc about its axis A—A, the braking band is swept by the contact area 40 over its entire circular extent.

According to an example embodiment, the width of the contact area 40 corresponding to the width of the friction material of the pad, considered in a radial direction relative to the disc, is defined as the swept width h of the braking surface. On the corresponding braking surface, the swept width h extends, in a radial direction r relative to the disc, between an inner circle 41a and an outer circle 41b. The inner circle 41a is disposed in the inner portion of the braking surface but slightly farther out than the above-mentioned inner edge 20, and the outer circle 41b is disposed in the outer portion of the braking surface but slightly farther in than the outer edge 22. The swept width h is slightly less than the width H of the respective braking surface. For a braking band with a diameter of approximately 328 mm, the width H of the braking surface may be approximately 53.5 mm.

According to an example embodiment, the fins 30 may extend, in a radial direction r, over a portion of the braking band less than the width H of the respective braking surface. The fins 30 may extend, in a radial direction r, over a portion of the braking band less than the swept width h of the respective braking surface. FIG. 5b shows, in broken outline, the edge of the contact area 40 relating to the instantaneous position of a pad during a braking operation during the rotation of the disc.

According to an embodiment of the present invention, at least one of the two braking surfaces 16, 18 comprises a plurality of channels or grooves.

According to an example embodiment, the grooves may be arranged in a uniform distribution within the respective braking surface. According to an example embodiment, the grooves may be arranged with a uniform distribution having a pattern or module 42 which is repeated periodically in a circumferential direction around the entire braking surface. Each groove is closed, that is, it has ends which do not emerge on the outside of the braking band but remain within the width H of the braking surface. In this manner, the grooves are distributed in an annular portion of the braking surface which has, in a radial direction r relative to the disc, a width h' less than the width H of the braking surface. According to a possible embodiment, the grooves are distributed in an annular portion of the braking surface which has, in a radial direction r relative to the disc, a width h', also known as the "scraped" width, which is less than the width h swept by the friction material of the pads.

The grooves are distributed in an annular portion of the braking surface which extends from an inner radius r1 to an outer radius r2, the said radii falling within the braking surface. The radius of the circle tangential to the inner ends of the grooves which lie in a region of the braking band disposed nearer to the axis of rotation A—A is defined as the inner radius r1. The radius of the circle tangential to the outer ends of the grooves which lie in a region of the braking band disposed nearer to the outside of the disc is defined as the outer radius r2.

According to an example embodiment, the inner edge 20 of the braking surface, the inner circumference 41a of the contact area, the inner radius r1, the outer radius r2, the outer circumference 41b of the contact area, and the outer edge 22 of the braking surface are encountered, in order, in a radial direction r relative to the disc and in a direction away from the centre.

In the embodiments described, a closed groove is a groove of which the edge defined by the intersection between the braking surface and the recess of the groove is a line which is closed onto itself. The radial extent of the portion having the grooves coincides with the radial extent of the module 42, as defined above.

The module 42 comprises a first groove 44 has a predominant line of extent 46, that is, a line along which the first groove extends with a length L1 much greater than the width of the groove, considered in a direction transverse the predominant line of extent. The predominant line of extent 46 is defined substantially by the centreline of the groove, relative to its width.

The straight line along which the groove extends is defined as its axis and is represented, for example, by the straight line that joins the two ends of the groove. For the first groove, the axis is indicated 46a. The long groove 44 may extend over the respective braking surface for a distance substantially equal to the width h' which is less than the swept width h. According to an example embodiment, the axis 46a of the first groove 44 is inclined to a radial direction r and, in particular, is inclined in the opposite direction to the direction of rotation R of the disc.

According to another example embodiment, the first groove 44 extends along the predominant line of extent 46 with a length L1 both greater than the width h' of the portion covered by the grooves and greater than the swept width h of the respective braking surface. The predominant line of extent 46 of the first groove 44 may be arcuate and have its concave portion facing in the direction of rotation R of the disc. If a radius or vector 45 perpendicular to the predominant line of extent 46 or to the axis 46a of the long groove 44 and directed towards the centre of curvature of the line defining the axis is taken as a reference, this vector 45 is directed in the same direction as the principal direction of rotation R.

According to another example embodiment, arcuate long grooves 44 may be inclined in radial directions r in a manner such that the vector 45 defined above is directed substantially towards the outside of the disc, relative to a circle of the braking band 14 extending through a central point of the groove. The outer portion of the long groove 44, that is, the portion disposed nearer to the outside of the disc, has a predominant line of extent substantially close to a radial direction r.

The shape of the long groove may be comparable in shape to a spoon, and may be suitable for collecting the worn friction material in the direction of rotation of the disc. This effect is improved by the inclination of the axis of the long groove 44 and is emphasized by its concavity, with a substantially radial outer portion.

With regard to the foregoing description, the long groove 44 may be defined as a set of two short grooves each of which has a length equal to half of L1 and which are arranged in alignment along the same predominant line of extent as if one continued into the other, that is, as if they were two communicating grooves.

According to an example embodiment, the concavity of the first groove 44 is the opposite of that of the fins 30.

Additionally, the predominant line of extent of the first groove 44 may be a portion of a circle, for example, having its centre disposed towards the outside of the braking band relative to a circle of the braking band 14 extending through a central point of the groove. According to an example embodiment, the long groove 44 has a radius of between 60 mm and 76 mm, such as 68 mm. The long groove 44 may extend from an inner radius r1 approximately equal to the radius of the inner edge 20 of the braking band plus 3–6 mm, such as 4.5 mm.

The ends of the grooves are defined by respective circle portions the radius of which corresponds substantially to the radius of the tool used. The position of the centre of the circle coincides with the final position of the centre of the shank of the tool. According to an example embodiment, the final position of the centre of the shank of the tool is at a distance from the axis of rotation A—A of approximately 110 mm–120 mm, such as 116.5 mm, for the inner end and approximately 155 mm–165 mm, such as 158 mm, for the outer end. The predominant line of extent 46 of the first groove 44 may intersect the projection of the predominant line of extent 34 of at least one fin 30 on the braking surface.

According to an example embodiment, with respect to a radial direction of the disc, the first groove 44 includes an inner end 44a and an outer end 44b both of which are closed, that is, which do not emerge on the inside or on the outside of the braking band. The inner end 44a and the outer end 44b are arranged at an angular spacing a equal to approximately 8–14 hexagesimal degrees, such as 11 degrees. In other words, the long groove 44 extends to cover an arc a of approximately 8–14 degrees, such as 11 degrees.

The first groove 44 may include, in a plane perpendicular to the respective braking surface and to the predominant line of extent 46, an arcuate cross-section, that may correspond to a portion of a circle. The module 42 also include a second groove 48 or inner short groove. This inner short groove has a predominant line of extent 50, that is, a line along which the second groove extends with a length L2 greater than the width of the groove considered in a direction transverse the predominant line of extent. The predominant line of extent 50 is defined substantially by the centreline of the groove, relative to its width.

According to the definition given above, the axis of the second groove 48 is indicated 50a. The inner short groove 48 extends over the respective braking surface for a distance less than the swept width h of the braking surface. According to an example embodiment, the second groove 48 extends over the respective braking surface for a distance equal to approximately half of the "scraped" width h' of the braking band.

According to an example embodiment, the axis 50a of the inner short groove 48 is inclined to a radial direction r. The inner short groove may also be inclined in the direction of rotation R of the disc, or in a radial direction in the opposite direction to the inclination of the long groove 44.

According to an example embodiment, a second groove 48 extends along the predominant line of extent 50 with a length L2 less than the width H of the respective braking surface and less than the swept width h of the contact area 40. The length L2 may be less than the length L1 of the long groove 44 and, according to a particular embodiment, L2 may be approximately equal to half of L1.

The predominant line of extent 50 of the second groove 48 may arcuate and have a concave portion facing substantially in the direction of rotation R of the disc. Thus, if a radius or vector 51 perpendicular to the predominant line of extent 50 or to the axis 50a of the inner short groove 48 and directed towards the centre of curvature of the line defining the axis is taken as a reference, vector 51 is directed in the same direction as the principal direction of rotation R of the disc.

According to an example embodiment, the concave portion of the second groove 48 is aligned opposite to the fins 30. The concavity of the second groove 48 may be arranged substantially in accordance with that of the first groove 44, for example, relative to the direction of rotation of the disc.

According to an exampe embodiment in which the inner short grooves 48 are arcuate, the inner short grooves 48 may be inclined in radial directions r in a manner such that the vector 51 defined above is directed substantially towards the inside of the disc, relative to a circle extending through a central point of the groove. The inner portion of the inner short groove 48, that is, the portion nearer the axis of rotation A—A, then has a predominant line of extent close to a radial direction r.

According to a further example embodiment, the predominant line of extent of the second groove 48 is a portion of a circle, for example, having its centre disposed substantially towards the inside of the braking band, relative to a circle extending through a central point of the groove. According to an example embodiment, the predominant line of extent of the second groove 48 has a radius of between 25 and 40 mm, such as 33.5 mm.

According to another example embodiment, the inner short groove 48 extends from an inner radius r1 approximately equal to the radius of the inner edge 20 of the braking band plus 3–6 mm, such as 4.5 mm. The final position of the centre of the shank of the tool for the inner short groove may be at a distance from the axis of rotation A—A of approximately 110 mm–120 mm, such as 116.5 mm, for the inner end and approximately 130–140 mm, such as 135 mm for the outer end (intermediate radius r3). According to an example embodiment, the intermediate radius is approximately equal to half of the sum of the inner radius and of the outer radius +/−5 mm.

According to another example embodiment, the predominant line of extent 50 of the second groove 48 intersects the projection of the predominant line of extent 34 of at least one fin 30 on the braking surface. With respect to a radial direction of the disc, the inner short groove 48 may include an inner end 48a and an outer end 48b both of which are closed, that is, which do not emerge on the inside or on the outside of the braking band. The definition of a closed groove is similar both for the long groove and for the inner short groove. In particular, a groove of which the edge defined by the intersection between the braking surface and the recess of the groove is a line which is closed onto itself and does not cross itself is defined as a closed groove.

The inner end 48a of the inner short groove 48 may be disposed on the circle which has the axis of rotation A—A as its centre and on which the inner end 44a of the long groove 44 lies. According to an example embodiment, the outer end 48b of the inner short groove 48 lies substantially on the circle which has the axis of rotation A—A as its centre and which divides the long groove 44 into two halves. According to a particular embodiment, the inner end 48a and the outer end 48b may be arranged at an angular spacing b equal to approximately 2–8 degrees, such as 5 degrees. In other words, the inner short groove 48 extends to cover an arc b of approximately 2–8 degrees, such as 5 degrees.

According to an example embodiment, the portion of braking surface disposed between the first groove and the second groove has an angular extent g variable from 0 to approximately 5 degrees, such as 3 degrees. In other words, between the long groove and the inner short groove, there is an angular portion of braking surface which is free of grooves and which extends through an arc g variable from 0 to approximately 5 degrees, such 3 degrees. According to a further example embodiment, the long groove and the inner short groove may also overlap by an angle.

According to an example embodiment, the inner short groove 48 may immediately follow the long groove 44 around the braking band in the opposite direction to the principal direction of rotation R of the disc.

According to another example embodiment, the second groove 48 has, in a plane perpendicular to the respective braking surface and to the predominant line of extent 50, an arcuate cross-section that may correspond to a portion of a circle. The module 42 may also include a third groove 52, or outer short groove, which has a predominant line of extent 54, that is, a line along which the third groove extends with a length L3 greater than the width of the groove, considered in a direction transverse the predominant line of extent. The predominant line of extent 54 is defined substantially by the centreline of the groove, relative to its width. The axis of the third groove 52 is indicated 54a.

The outer short groove 52 may extend over the respective braking surface for a distance that is less than the swept width h of the braking surface. According to a possible embodiment, the outer short groove 52 extends over the respective braking surface for a distance equal to approximately half of the "scraped" width h' of the braking band.

The axis 54a of the outer short groove 52 may be inclined in a radial direction r. According to an example embodiment, this axis is inclined in the direction of rotation R of the disc. According to another example embodiment, the outer short groove 52 is inclined in a radial direction r in the opposite direction to the inclination of the long groove 44. The outer short groove 52 may be inclined in a radial direction r in the same direction as the inclination of the inner short groove 48.

The third groove 52 may extend along the predominant line of extent 54 with a length L3 less than the width H of the braking band and less than the swept width h of the respective braking surface. The length L3 may be less than the length L1 of the long groove 44. According to an example embodiment, the length L3 may be approximately equal to the length L2 and both may be approximately equal to half of the length L1.

According to an example embodiment, the predominant line of extent 54 of the third groove 52 is arcuate and has its concavity facing in the direction of rotation R of the disc. Thus, if a radius or vector 55 perpendicular to the predominant line of extent 54 or to the axis 54a of the outer short groove 52 and directed towards the centre of curvature of the line defining the axis is taken as a reference, this vector 55 is directed in the same direction as the principal direction of rotation R of the disc.

The concave portion of the outer short groove 52 may be opposite that of the fins 30. According to an example embodiment, the concave portion of the outer short groove may be arranged substantially in accordance with that of the first groove 44 and of the second groove 48.

According to an example embodiment in which the outer short grooves 52 are arcuate, the grooves 52 may be inclined to radial directions r in a manner such that the vector 55 defined above is directed substantially towards the inside of the disc, relative to a circle extending through a central point of the groove. The inner portion of the outer short groove 52, that is, the portion nearer the axis of rotation A—A, may have a predominant line of extent substantially close to a radial direction r.

The predominant line of extent 54 of the third groove 52 may be a portion of a circle, for example, having its centre disposed substantially towards the inside of the braking band, relative to a circle extending through a central point of the groove. According to an example embodiment, the predominant line of extent 54 of the third groove 52 may have a radius approximately equal to 40–55 mm, such as 47 mm. The outer short groove 52 may extend as far as an outer radius r2 approximately equal to the radius of the outer edge 22 of the braking band, minus 3–6 mm, such as 4.5 mm.

According to a possible embodiment, the final position of the centre of the shank of the tool for the outer short groove may be at a distance from the axis of rotation A—A of approximately 130–140 mm, such 135 mm, for the inner end, and approximately 155–165 mm, such as 158 mm, for the outer end. According to an example embodiment, the intermediate radius may be approximately equal to half of the sum of the inner radius and of the outer radius +/−5 mm.

The predominant line of extent 54 of the third groove 52 may intersect the projection of the predominant line of extent 34 of at least one fin 30 on the braking surface. With respect to a radial direction of the disc, the outer short groove 52 may include an inner end 52a and an outer end 52b both of which are closed, that is, which do not emerge on the inside or on the outside of the braking band. The definition of a closed groove is similar both for the long groove and for the outer short groove. In particular, a groove of which the edge defined by the intersection between the braking surface and the recess of the groove is a line which is closed onto itself is defined as a closed groove.

According to an example embodiment, the outer end 52b of the outer short groove 52 is disposed on the circle which has the axis of rotation A—A at its centre and on which the outer end 44b of the long groove 44 lies. According to a possible embodiment, the inner end 52a of the outer short groove 52 lies substantially on the circle which has the axis of rotation A—A as its centre and which divides the long groove 44 into two halves. The final inner position of the shank for the outer short groove 52 may lie substantially on the circle which has the axis of rotation A—A as its centre and on which the final outer position of the inner short groove 48 lies.

According to another example embodiment, the inner end 52a and the outer end 52b may be arranged at an angular spacing d equal to approximately 2–8 degrees, such as 5 degrees. The outer short groove 52 may extend to cover an arc d of approximately 2–8 degrees, such as 5 degrees. In other words, the two, inner and outer, short grooves may include portions that overlap in a circumferential direction.

The portion of the braking surface disposed between the inner short groove 48 and the outer short groove 52 may have an angular extent e varying from 0 degrees to approximately 6 degrees, such as 3 degrees. In other words, between the inner short groove and the outer short groove, there is an angular portion of braking surface which is free of grooves and which extends through an arc e variable from 0 degrees to approximately 6 degrees, such as 3 degrees. According to an example embodiment, the angular spacing q between the long groove 44 and the outer short groove 52 is between 7 degrees and 15 degrees, such as 11 degrees.

The outer short groove 52 is the groove which immediately follows the inner short groove 48 around the braking band in the opposite direction to the principal direction of rotation R of the disc. The outer short groove 52 may have an arcuate cross-section in a plane perpendicular to the respective braking surface and to the predominant line of extent 54, which may correspond to a portion of a circle. According to an example embodiment, the angular extent f of a module 42 may be between 22 degrees and 30 degrees, such as 27 degrees. According to an example embodiment, the angular spacing 1 between two adjacent modules is between 0 and 8 degrees, such as 3 degrees. Furthermore, according to an example embodiment, none of the grooves intersect one another.

The angular extent of a module and the angular spacing between two adjacent modules may be such that an extent of the braking surface of the contact area 40 includes substantially at least one long groove 44, one inner short groove 48, and one outer short groove 52, which also belong to adjacent modules.

The uniform distribution of the grooves may repeat in a pattern with a sequence of two short grooves arranged alternately in inner and outer portions of the braking band. A long groove may alternate with two short grooves, with the opposite inclination to the two short grooves and making optimal use of the braking surface.

The arrangement of the grooves on the braking surface, within the area covered by one module, is such that, on average, the presence of "voids" and "solid areas" is distributed uniformly over the area, "voids" meaning the portions of the braking surface that are occupied by the grooves and "solid areas" the portions of braking surface cooperating with the pad.

The two short grooves may cover substantially the whole of the braking band in a radial direction and, since they are separate, may together cover a greater arc than the long groove.

There are a very large number of different known distributions of grooves on braking surfaces and they are provided with various, often conflicting, objectives. The described distributions according to the present invention enable an optimal trade-off to be achieved between conflicting objectives, enhancing, in particular, braking efficiency and the effective discharge of abrasive material, uniformity of abrasion, and the elimination of vibrations induced in the disc and in the pad during their interaction during a braking operation. The groove arrangements according to the present invention also enable the above-mentioned effects to be achieved in the most uniform manner possible, both radially and tangentially.

The interaction between the friction material and the edge of a groove causes a slight stress in the pad which has a component in a radial direction. The provision of a long groove inclined in one direction and two short grooves inclined in the other direction and alternating circumferentially around the braking surface enables the directions of the radial components on the pad to alternate.

The effect of the long groove is of greater magnitude than that of the short grooves taken individually, but is comparable to the overall effect of the two short grooves which are both inclined in the same direction. Any vibrations are compensated in excellent manner by virtue of the compactness and uniformity of the distribution which is ensured by the presence of two short grooves which can be positioned better relative to the braking surface, as well as by their opposite inclination to the long groove. The alternation of one long groove and two short grooves having the opposite inclination to the long groove, relative to radial directions, enables best use to be made of the braking surface available, "filling" it in optimal manner and with more uniformly distributed effects. In other words, the distribution between solid areas and voids, with reference to the presence and to the absence of the grooves, may be more compact and more variously distributed than sequences of grooves with the same inclination.

The risk of vibrations is thus reduced by the compactness and uniformity of distribution of the grooves, in particular within the module. According to an example embodiment, the narrow angular extent of the module and the proximity of adjacent modules further limits the risk of vibrations and enables the individual positive effects of the grooves to be exerted on the friction material of the pad, whilst at the same time cancelling out the individual adverse effects.

In particular, the risk of vibrations can be reduced to practically zero, due to the alternating inclination as described above, leaving only the beneficial effects of an improvement in braking efficiency and of uniform wear of the pads and of the disc.

As well as being easier to position in order to produce a compact and uniform distribution, an arrangement of one long groove and two short grooves also enables, for example, the mean friction between the pad and the braking surface to be increased. The two short grooves may be distributed in a chessboard pattern, enabling the area of contact with the pad to be filled to the greatest possible extent. This positive effect is even more marked when the area of contact has a circumferential extent and possibly a radial extent equal to that of at least one module.

The provision of two short grooves having concave portions with vectors directed in the direction of rotation R and inclined towards the inside of the disc, relative to the central circumferential line, and of a long groove which has a concave portion with a vector directed in the direction of rotation but facing towards the outside, relative to the central circumferential line, contributes an effect which, unusually, is particularly effective, especially in achieving a very high mean coefficient of friction.

The long groove also facilitates the evacuation of the abraded dust since it extends continuously approximately over the entire "scraped" width of the braking surface. This effect is enhanced by the fact that the long groove is inclined in the opposite direction to the principal direction of rotation of the disc. In fact, during the rotation of the disc, the pad first of all encounters the inner portion of the groove, leaving the outer portion free, so that the abraded dust can be evacuated centrifugally. Thus, the long groove enables the dust of the material abraded by the braking operation to be collected and, without discontinuity, to be conveyed towards the outer edge of the braking band for evacuation. This effect may be enhanced by the concave portions of the long groove and, in particular, by the concave portions having a vector directed in the direction of rotation R. In fact, the outer portion of the long groove is arranged with a substantially radial predominant line of extent. Moreover, the long groove is substantially like a spoon which collects the abraded material from the very inside of the disc and transports it continuously to the outside.

Advantageously, the braking action is also more uniform, as is the flow of the forces along the braking surface which follows the distribution of the "solid areas" between the grooves. In parallel arrangements of the grooves according to the prior art, the pad presses against a circumferential alternation of "voids" and "solid areas" which extend substantially over the entire "scraped" width of the braking band, giving rise to an alternation in the braking force exerted on the disc. The compact distribution achieved and also the variability of the radial positions of "voids" and "solid areas" limits this effect to the minimum.

Moreover, the arrangements of the grooves according to the present invention enable them to be distributed compactly in a circumferential direction, while still retaining a groove-free area, which is distributed variously in both radial and circumferential directions, and to which the pad can transmit the force. The area suitable for transmitting the forces is thus distributed in a balanced manner, as are consequently the forces, so that the "centre of gravity" of the consequent action on the contact area produced by the braking force does not move excessively during the rotation of the disc.

Both the long groove and the two short grooves together extend over the entire "scraped" width h' which, for example, is slightly less than the width h swept by the pad. Both the long groove and the two short grooves together thus sweep the same width of the braking surface, avoiding giving rise to differentiated wear along the "scraped" width h'. Any portion of the swept width h which is not covered by the scraping and "dressing" effect of the grooves is limited since it is positioned in and limited to an inner ring and an outer ring of the braking band. Moreover, this portion which is swept but is not covered by the grooves prevents weakening of the outer edge of the disc, from which cracks or fissures may easily start, while ensuring evacuation of the abraded material, particularly by virtue of the presence of the long groove.

The presence of three different grooves that are active on the friction material simultaneously also enables a synergism to be created between their individual effects, enhancing the benefits and cancelling out the disadvantages explained above.

For a ventilated band, the fact that the grooves are arranged to intersect the projection of at least one fin on the braking surface avoids weakening of the material between two fins. The thickness of which material is already limited owing the presence of the ventilation duct. The centrifugal effect of the grooves is improved by virtue of their inclination and concavity.

In any circle within the scraped width h', for each module or for each module arc, the effects of the long groove and of at least one of the short grooves are present.

Naturally, variations and/or additions may be provided for the embodiments described and illustrated above. For example, the band and the bell may be formed in a single piece. The connecting elements between the two plates may be formed by pins which, according to a possible embodiment, are arranged in succession from the inside of the band towards the outside along lines which thus extend in the same manner as the predominant lines of extent of the fins.

The description has been directed towards the distribution of the grooves on one of the braking surfaces. The other braking surface may have a reflectively symmetrical distribution with respect to a central plane of the braking band perpendicular to the axis A—A, or an opposite distribution. According to a possible embodiment, the grooves of one braking surface are in phase with those of the opposite braking surface. According to another example embodiment, the grooves of one braking surface are offset by one half interval relative to those of the opposite braking surface.

Figure 6:
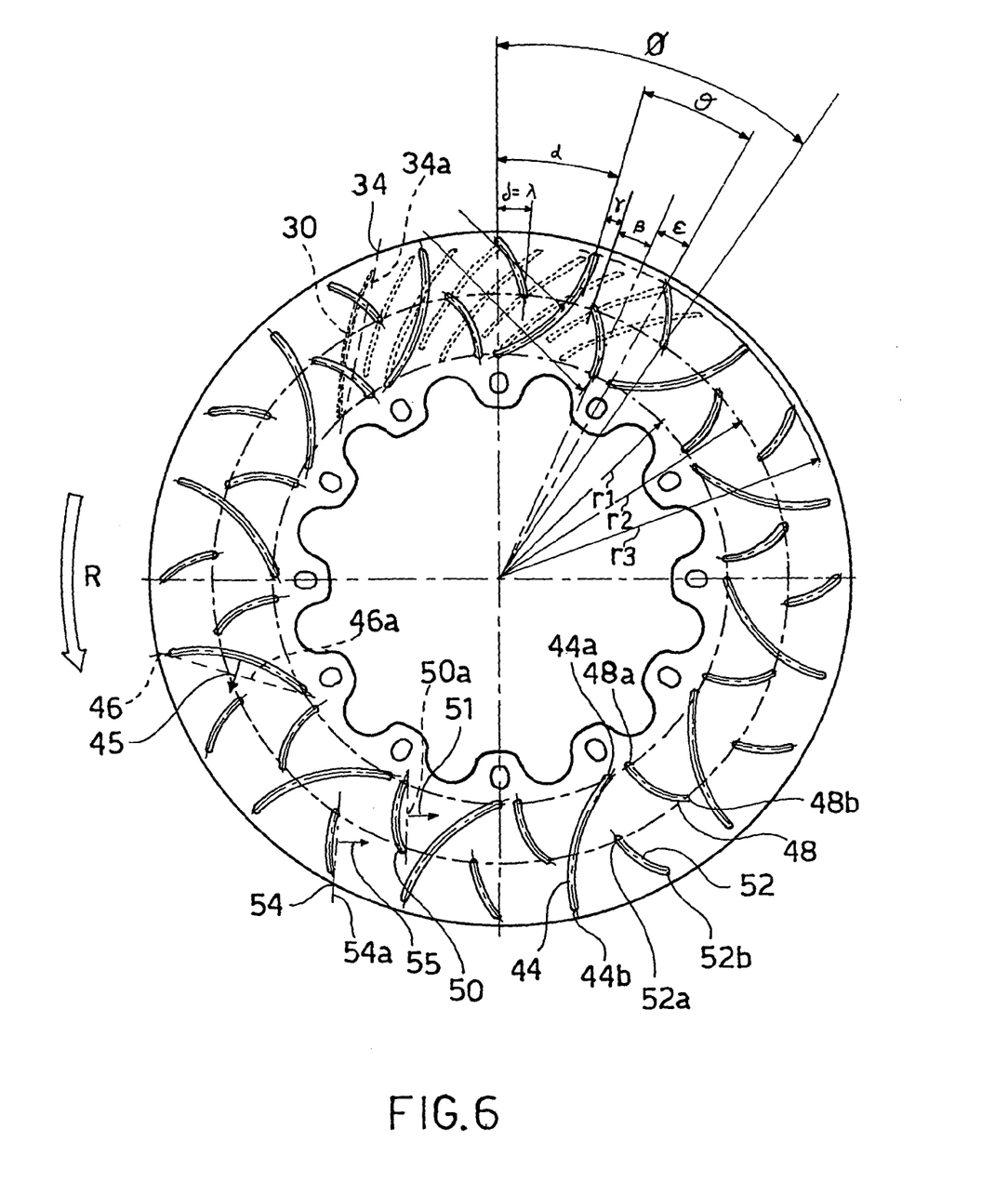
FIG. 6 is a plan view of a braking band of a disc-brake disc according to another example embodiment.

FIG. 6 shows an alternative embodiment of the braking band 14. In this embodiment, the long groove 44 may extend to cover and arc a of approximately 14–20 degrees, such as 17 degrees. The inner short groove 48 may extend to cover an arc b of approximately 2.5–8.5 degrees, such as 5.5 degrees. In addition, the portion of the braking surface disposed between the first groove and the second groove has an angular extent g variable from 0 to approximately 6 degrees, such as 2.5 degrees. Between the long groove and the inner short groove, there is an angular portion of braking surface which is free of grooves and which may extend through an arc g variable from 0 to approximately 6 degrees, such as 2.5 degrees.

Additionally, the outer short groove 52 may extend to cover an arc d of approximately 2–8 degrees, such as 5 degrees. The portion of the braking surface disposed between the inner short groove 48 and the outer short groove 52 may have an angular extent e variable from 2 to approximately 8 degrees, such as 5 degrees. Between the inner short groove and the outer short groove there is an angular portion of braking surface which is free of grooves and which extends through an arc e variable from 2 to approximately 8 degrees, such as 5 degrees. An angular spacing q between the long groove 44 and the outer short groove 52 may be between 10 and 16 degrees, such as 13 degrees.

The angular extent f of a module 42, meaning the arc between the inner end 44a of the first groove and the inner end of the third groove 52, may be between 30 and 40 degrees, such as 35 degrees.

According to a possible embodiment, the angular spacing g between two adjacent modules is negative, in the sense that two adjacent modules, as defined above partially overlap. According to a possible embodiment, the overlap of two adjacent modules 42 is substantially equal to the angular extent of the outer short groove 52, that is, the outer end 52b of the outer short groove 52 lies substantially on the same radius as the inner end 44a of the long groove 44.

Figure 7:
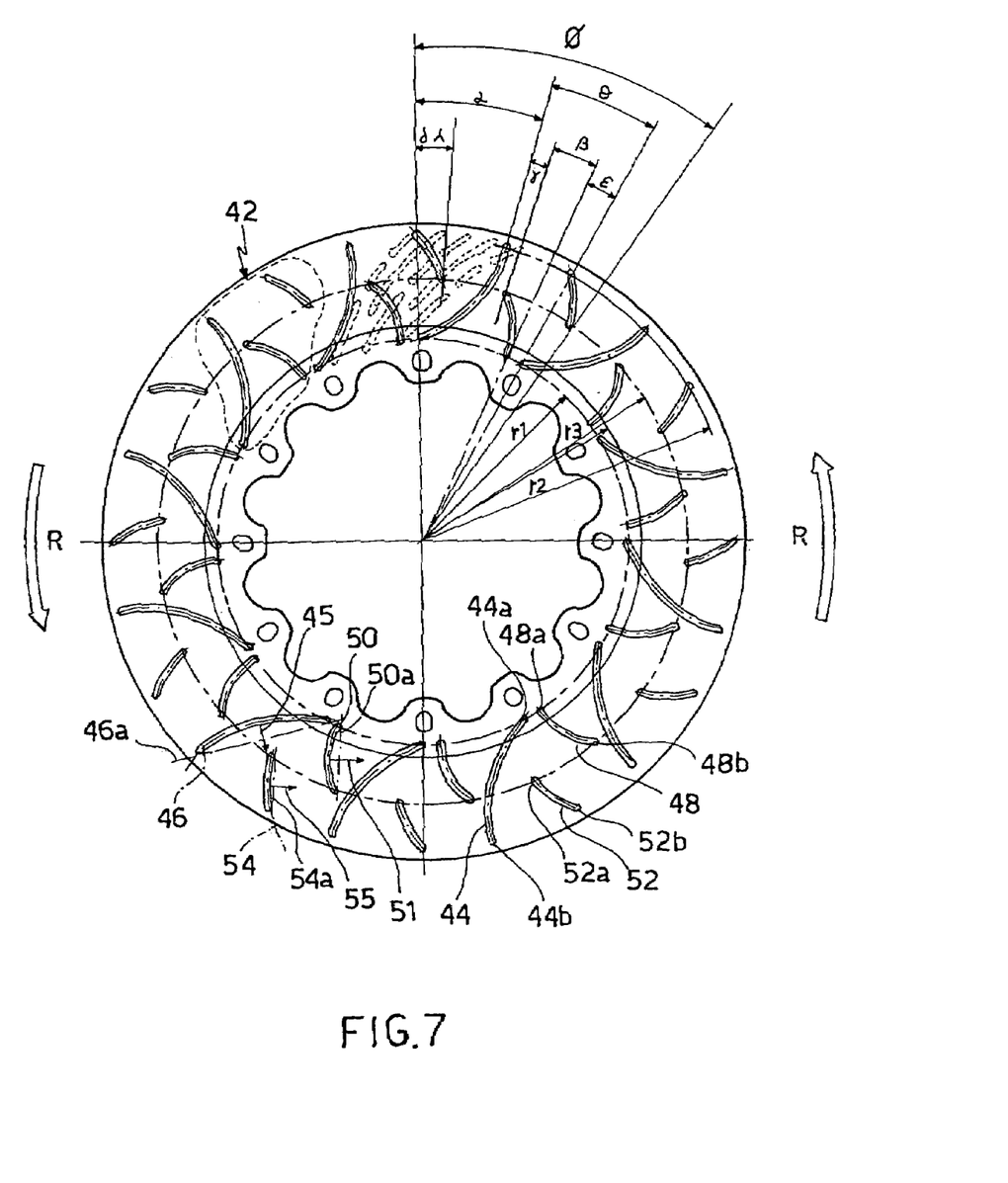
FIG. 7 is a plan view of a braking band of a disc-brake disc according to another example embodiment.

According to a possible embodiment, the radius of the long groove 44 is approximately 60–80 mm, such as 70 mm. According to an example embodiment, the inner radius r1 is approximately 100–110 mm, such as 106 mm. FIG. 7 shows another embodiment of the braking band 14. According to this embodiment, the long groove 44 extends to cover an arc a of approximately 14–20 degrees, such as 17 degrees.

The inner short groove 48 extends to cover an arc b of approximately 2.5–8.5 degrees, such as 5.5 degrees. The portion of braking surface disposed between the first groove and the second groove has an angular extent g variable from 0 to approximately 6 degrees, such as 2.5 degrees. In other words, between the long groove and the inner short groove, there is an angular portion of braking surface which is free of grooves and which extends through an arc g variable from 0 to approximately 6 degrees, such as 2.5 degrees.

The outer short groove 52 may extend to cover an arc d of approximately 2–8 degrees, such 5 degrees. The portion of braking surface disposed between the inner short groove 47 and the outer short groove 52 may have an angular extent e variable from 2 to approximately 8 degrees, such as 5 degrees. Between the inner short groove and the outer short groove, there may be an angular portion of braking surface which is free of grooves and which may extend through an arc e variable from 2 to approximately 8 degrees, such as 5 degrees.

The angular spacing q between the long groove 44 and the outer short groove 52 is between 10 and 16 degrees, such as 13 degrees.

The angular extent f of a module 42, meaning the arc between the inner end 44a of the first groove and the inner end of the third groove 52 is between 30 and 40 degrees, such as 35 degrees. The angular spacing 1 between two adjacent modules may be negative, in the sense that two adjacent modules, as defined above, partially overlap. According to an example embodiment, the overlap of two adjacent modules 42 may be substantially equal to the angular extent of the outer short groove 52. Thus, the outer end 52b of the outer short groove 52 may lie substantially on the same radius as the inner end 44a of the long groove 44. The radius of the long groove 44 may be approximately 60–80 mm, such as 70 mm.

All of the fins of the embodiment of FIG. 6 are constituted by continuous walls, whereas some of the fins of FIG. 7 are constituted by continuous walls and some are constituted by interrupted walls.

Figure 8:
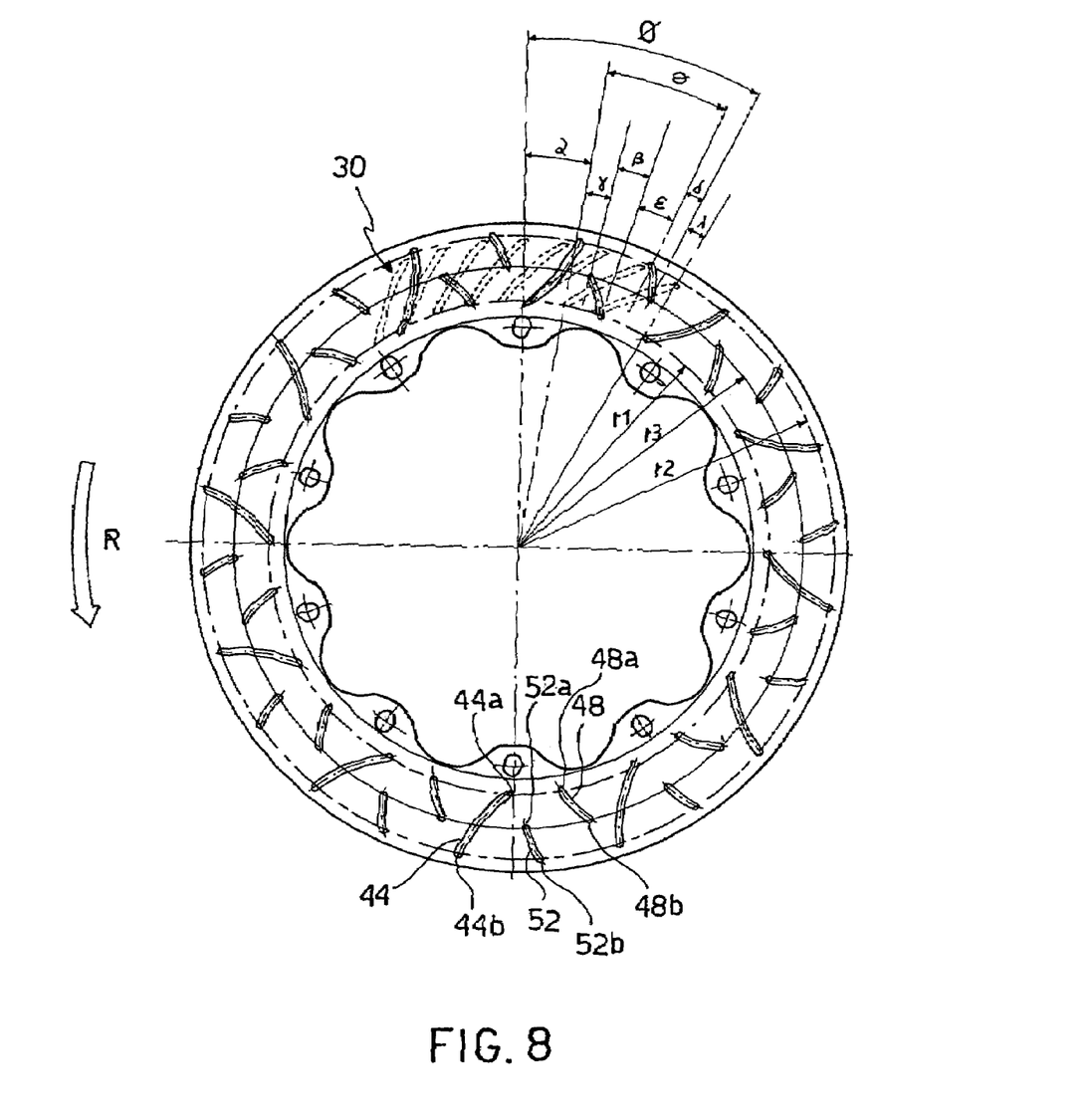
FIG. 8 is a plan view of a braking band of a disc-brake disc according to still another example embodiment.

FIG. 8 shows a possible variant of the braking band 14. According to this possible embodiment, the long groove 44 may extend to cover an arc a of approximately 7–13 degrees, such as 10 degrees.

The inner short groove 48 may extend to cover an arc b of approximately 1.7–7.7 degrees, such as 4.7 degrees. The portion of braking surface disposed between the first groove and the second groove may have an angular extent g variable from 0 to approximately 8 degrees, such as 4 degrees. In other words, between the long groove and the inner short groove, there is an angular portion of braking surface which is free of grooves and which extends through an arc g variable from 0 to approximately 8 degrees, such as 4 degrees.

The outer short groove 52 may extend to cover an arc d of approximately 0–5 degrees, such as 2.5 degrees. The portion of braking surface disposed between the inner short groove 48 and the outer short groove 52 may have an angular extent e variable from 2.8 to approximately 8.8 degrees, such as 5.8 degrees.

In other words, between the inner short groove and the outer short groove, there is an angular portion of braking surface which is free of grooves and which extends through an arc e variable from 2.8 degrees to about 8.8 degrees, such as 5.8 degrees.

The angular spacing q between the long groove 44 and the outer short groove 52 is between 11.5 and 17.5 degrees, such as 14.5 degrees.

The angular extent f of a module 42, meaning the arc between the inner end 44a of the first groove and the inner end of the third groove 52 may be between 24 and 30 degrees, such as 27 degrees.

According to an example embodiment, the angular spacing 1 between two adjacent modules may be between 0 degrees and 6 degrees, such as 3 degrees.

According to another example embodiment, the final position of the shank for the long groove may be approximately 115–125 mm, such as 118.5 mm, and for the inner end and approximately 145–155 mm, such as 150.5 mm. The intermediate radius may be approximately 130–140 mm, such as 135 mm.

Figure 9:
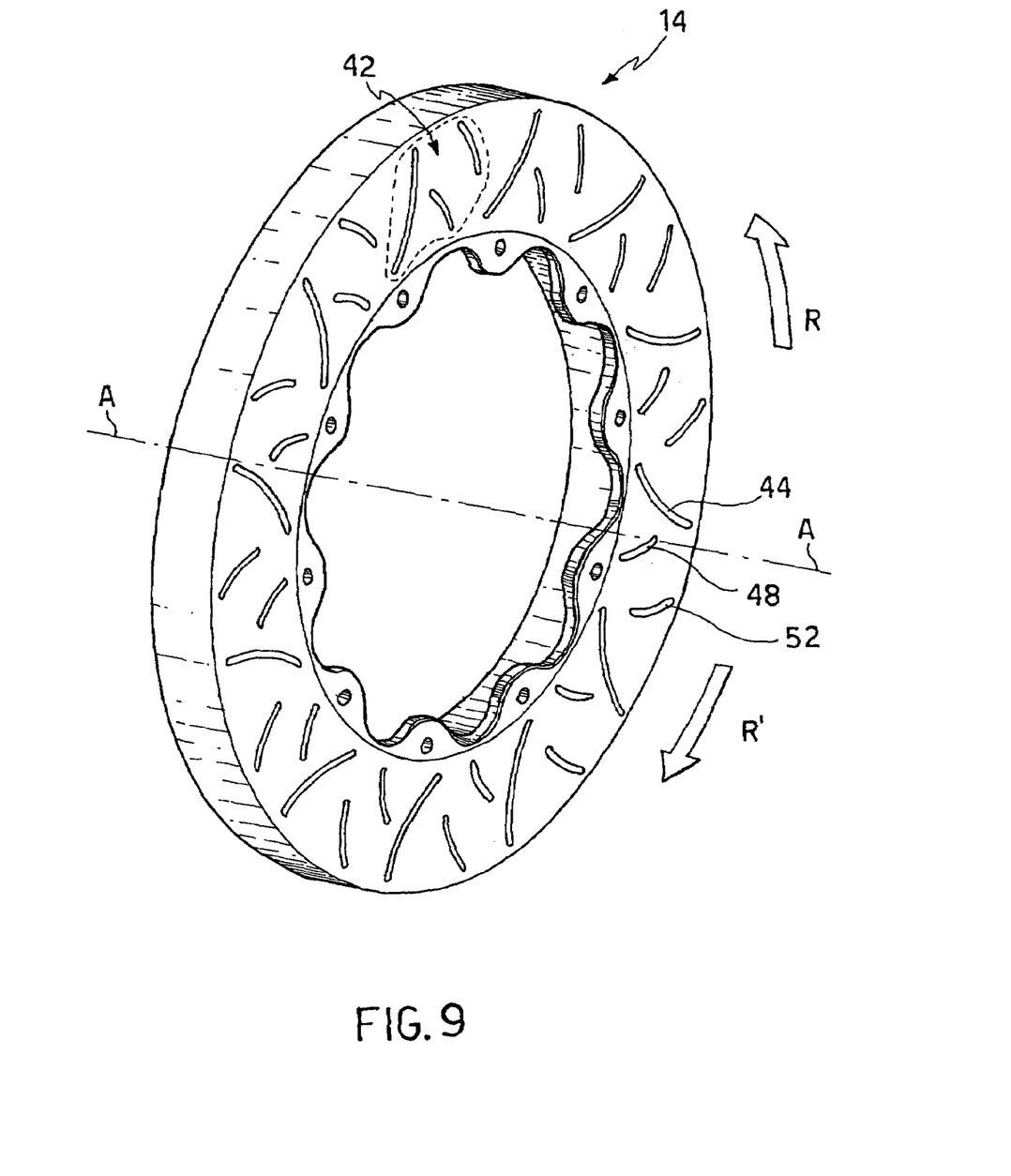
FIG. 9 is a perspective view of a braking band of a disc-brake disc according to another example embodiment.

The grooves of a module may be reflectively symmetrical with respect to a diameter, thus rendering the direction of inclination and any concave portions independent of the principal direction of rotation of the vehicle. The concave portions and the inclination of the grooves, when considered relative to the principal direction of rotation R' of the disc, may be oppositely aligned. A possible embodiment is shown in FIG. 9, with reference to the principle direction of rotation R'.

In order to satisfy contingent and specific requirements, a person skilled in the art may apply to the above-described embodiments of the braking band, many modifications, adaptations and replacements of elements with other functionally equivalent elements without, however, departing from the scope of the appended claims.

The invention claimed is:

1. A braking band for a disc-brake disc configured to rotate about a rotation axis, the braking band comprising:
opposed annular braking surfaces which each extend from an inner edge facing towards the axis of rotation, to an outer edge facing towards an outside of the disc, at least one of the annular braking surfaces including a uniform distribution of grooves on at least one of the braking surfaces, the distribution of grooves having a module pattern which is repeated circumferentially, each of the grooves being closed and extending along a predominant line of extent defining an axis of said groove, and no groove intersecting other grooves, the module extending from an inner radius to an outer radius of the annular portion of the braking surface and including:
a first groove extending without interruption substantially from the inner radius to the outer radius,
a second groove shorter than the first groove, and
a third groove shorter than the first groove,
wherein the axis of the second groove and the axis of the third groove are inclined opposite to an inclination of the axis of the first groove, relative to a radial direction of the braking band, the second groove and the third groove of the module extending, taken together, in a radial direction for a distance substantially equal to a radial extent of the first groove of the module, and
wherein the module extends radially a distance less than a width of the respective braking surface upon which it is situated.

2. The braking band according to claim 1, wherein the first groove extends radially along the respective braking surface for a distance less than the width swept by a brake pad.

3. A braking band for a disc-brake disc configured to rotate about a rotation axis, the braking band comprising:
two plates arranged facing one another so as to form an air-outlet space, each plate defining an annular braking surface which extends from an inner edge facing towards the axis of rotation to an outer edge facing towards an outside of the respective plate, at least one braking surface having a uniform distribution of grooves, the distribution having a pattern module which is repeated circumferentially, each of said grooves being closed and non-intersecting and extending along a predominant line of extent defining an axis of said groove, the module extending from an inner radius to an outer radius of the braking surface, the module including:

a first groove which extends without interruption substantially from the inner radius to the outer radius, a second groove shorter than the first groove, and a third groove shorter than the first groove, wherein the axes of the second groove and of the third groove have an opposite inclination to the inclination of the axis of the first groove relative to a radial direction of the braking band.

4. A braking band according to claim 3, wherein the plates are connected to one another by connecting elements which extend from one plate to the other within the air-outlet space.

5. A braking band according to claim 4, wherein the connecting elements include fins configured as ventilation ducts extending along a predominant line of extent defining an axis.

6. A braking band according to claim 5, wherein the axis of each of the fins is inclined in a radial direction of the disc.

7. A braking band according to claim 6, wherein the axis is inclined in an opposite direction from a rotational direction of the disc.

8. A braking band according to claim 3, wherein the predominant line of extent is arcuate and includes a concave portion facing in an opposite direction from a rotational direction of the disc.

9. A braking band according to claim 5, wherein the predominant line of extent is arcuate and the fins are inclined in a radial direction such that a vector perpendicular to the predominant line of extent and directed towards its center is directed substantially towards the inside of the disc, relative to a circle extending through a central point of the fin.

10. A braking band according to claim 5, wherein the predominant line of extent of a fin is a portion of a circle with its center disposed substantially on the inside of the braking band.

11. A braking band according to claim 5, wherein the fins extend in a radial direction over a portion of the braking band less than the width of the respective braking surface.

12. A braking band according to claim 5, wherein the predominant line of extent of the first groove is curved in an opposite manner to the predominant lines of extent of the fins.

13. A braking band according to claim 5, wherein the predominant line of extent of the first groove intersects a projection of the predominant line of extent of at least one fin on the braking surface.

14. A braking band according to claim 5, wherein the predominant line of extent of the second groove has an opposite concavity to a concavity of the predominant lines of extent of the fins.

15. A braking band according to claim 5, wherein the predominant line of extent of the second groove intersects a projection of the predominant line of extent of at least one fin on the braking surface.

16. A braking band according to claim 5, wherein the predominant line of extent of the third groove has an opposite concavity to a concavity of the predominant lines of extent of the fins.

17. A braking band according to claim 5, wherein the predominant line of extent of the third groove intersects a projection of the predominant line of extent of at least one fin on the braking surface.

18. The braking band according to claim 5, wherein the first groove, the second groove and the third groove succeed one another consecutively in a circumferential direction.

19. The braking band according to claim 5, wherein an inner end of the third groove and an outer end of the first-groove have approximately the same radial position on the disc.

20. The braking band according to claim 5, wherein an inner end of the third groove is positioned approximately at a radial midpoint of the first groove.

21. The braking band according to claim 5, wherein the axis of the first groove is inclined away from a rotational direction of the disc.

22. The braking band according to claim 5, wherein the first groove has a predominant line of extent having a length greater than a width of the braking surface covered by grooves.

23. The braking band according to claim 5, wherein an outer portion of the first groove has a predominant line of extent that is directed in an approximately radial direction.

* * * * *